Mar. 27, 1923.                                                                          1,449,971.
W. M. CAMPBELL ET AL.
SAFETY APPLIANCE FOR LOCOMOTIVES AND THE LIKE.
FILED NOV. 12, 1920.
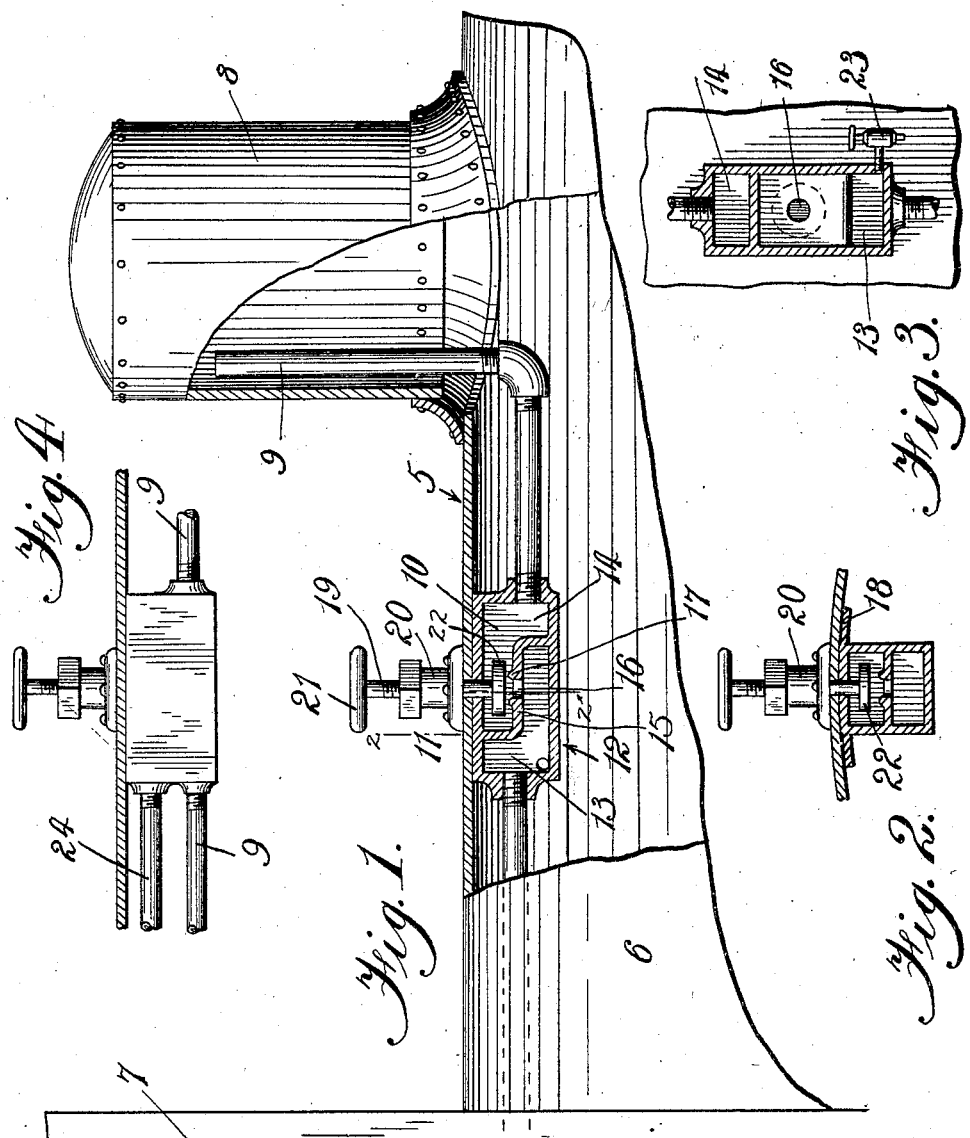
Inventors
Walter M. Campbell
Marven S. Smith
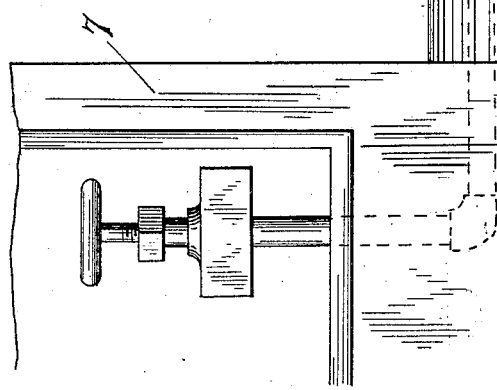
By William Chinton
Attorney Patented Mar. 27, 1923.

1,449,971

UNITED STATES PATENT OFFICE.

WALTER MURRAY CAMPBELL AND MARVIN STONER SMITH, OF ST. JOHN WEST, NEW BRUNSWICK, CANADA.

SAFETY APPLIANCE FOR LOCOMOTIVES AND THE LIKE.

Application filed November 12, 1920. Serial No. 423,553.

*To all whom it may concern:*

Be it known that we, WALTER M. CAMPBELL and MARVIN S. SMITH, subjects of the King of Great Britain, residing at St. John West, Province of New Brunswick, Canada, have invented certain new and useful Improvements in Safety Appliances for Locomotives and the like; and we do hereby declare that the following is a full, clear, and exact description of the invention, such as will enable others skilled in the art to which it appertains to make and use the same.

The present invention relates to improvements in safety appliances for locomotives and the like, and is a continuation in part of the inventions disclosed in my U. S. Patent No. 1,372,600, March 22, 1921.

Considerable danger and loss of life has been experienced by operators of locomotives and the like due to the scalding by steam in the locomotive cab in case of accident when the several steam pipes leading thereto become broken. When this is the case, it is necessary to cut off the supply of steam from within the cab which is practically impossible owing to the latter being filled with steam.

The primary object of this invention is the provision of means whereby this steam can be cut off from the steam dome or other source of steam supply prior to its entrance to the cab.

Another object of the invention is the provision of a valve arranged in the steam supply line exterior of the cab whereby the said steam can be cut off when desired for any purpose prior to its entrance to the cab.

A further object of the invention is the provision of a valve which can be used to cut off the supply of steam either to the cab or to the usual whistle or the like while the various parts thereof connected therewith are being repaired, thus preventing the necessity of allowing the steam to pass from the boiler prior to such necessary repair work.

A still further object of the invention is the provision of a safety appliance for locomotives and the like, which will be comparatively simple and inexpensive to manufacture, reliable and efficient in use, and readily operated.

With the above and other objects in view, the present invention resides in the novel features of construction, formations, combinations and arrangements of parts to be hereinafter more particularly described, claimed, and illustrated in the accompanying drawing forming a part of the present application, and in which:

Figure 1 is a longitudinal sectional view partly in elevation taken through a portion of a steam locomotive showing the invention applied thereto;

Figure 2 is a transverse sectional view taken on the line 2—2 of Figure 1;

Figure 3 is a detail sectional view of a valve casing showing a drain cock applied thereto for removing steam condensation and which serves as a steam separator; and, Figure 4 is a detail sectional view showing the application of the steam supply pipe for the whistle connected to said valve.

Referring now to the accompanying drawing by corresponding characters of reference throughout the several views, the numeral 5 designates in general a conventional form of locomotive, the same being partly broken away and sufficient parts thereof being shown for illustrating purposes only. The locomotive includes a boiler 6, cab 7, and steam dome 8 from which the steam is drawn through the usual supply pipe line 9 to the steam controlling apparatus 10 located within the cab.

A valve 11 is located in the pipe line 9 and operatively connected therewith at the opposite extremities of its casing 12 with which the said pipe line 9 communicates.

The valve casing 12 is divided into two compartments 13 and 14 by a partition 15 in which is formed an opening 16, the sides of which are raised, to form the valve seat 17.

The casing 12 as shown in Figure 1 of the drawing is positioned within the boiler 6 and secured to the upper side thereof by means of attaching flanges 18, but this illustration shows the application of the same in one place only and it is to be understood that the said valve may be placed in any desired position within the pipe line.

A valve stem 19 has threaded engagement within the sleeve 20 and is provided with the usual operating hand wheel 21 by means of which the stem can be moved longitudinally through the said sleeve 20. The stem 19 carries a head 22 which may be moved to and from the valve seat 17 for the purposes of closing the communication between the compartments 13 and 14.

The valve head 22 is normally positioned in spaced relation to the seat 17 so that the steam may pass from the dome 8 or other source of supply to the controlling apparatus 10. In case of accident or the disconnection of any of the pipes which are operatively connected to the controlling apparatus, the engineer or any other person may shut off the flow of steam into the cab by simply rotating the hand wheel 21 and forcing the head 22 into engagement with the valve seat 17 which shuts off communication between the steam dome and the cab, preventing the steam from flowing into the latter and injuring the occupants.

As shown in the drawing, the valve casing 12 may be provided with a suitable drain cock 23 adapted for the purpose of removing the water caused by the condensation of steam therefrom for obvious purposes.

As shown in Figure 4 of the drawing, if desired the steam supply pipe 24 from the whistle may be connected to the casing 12. At present if the whistle becomes out of order, it is necessary to remove the steam from the locomotive boiler in order that the same can be repaired, while in the present disclosure it is simply necessary to close the valve 11 which shuts off the steam to the whistle supply pipe, thus saving considerable loss of time when such repairs are necessary.

From the foregoing description taken in connection with the accompanying drawing, it will be manifest, that a safety appliance for locomotives is provided which may be used for various other purposes as well, and which will fulfil all of the necessary requirements of such a device.

It is understood in this connection, that various minor changes in the specific details of construction can be resorted to within the scope of the appended claims, without departing from the spirit or sacrificing any of the advantages of the invention.

Having thus fully described the invention, what is claimed and what we desire to protect by Letters Patent is:

The combination in a locomotive with a boiler, a source of steam supply, a cab, and a steam controlling apparatus, a casing including two compartments, each of said compartments being operatively connected to the steam supply line, a second steam supply pipe leading from one of said compartments and adapted for connection with an alarm, and a valve controlling the passage of steam between said compartments for cutting off the supply of steam to the steam controlling apparatus and the alarm.

In witness whereof we have hereunto set our hands.

WALTER MURRAY CAMPBELL.
MARVIN STONER SMITH.